Sept. 20, 1955  W. G. BONHAM  2,718,210
COMBINATION INCUBATOR AND BROODER
Filed March 30, 1949  4 Sheets-Sheet 1
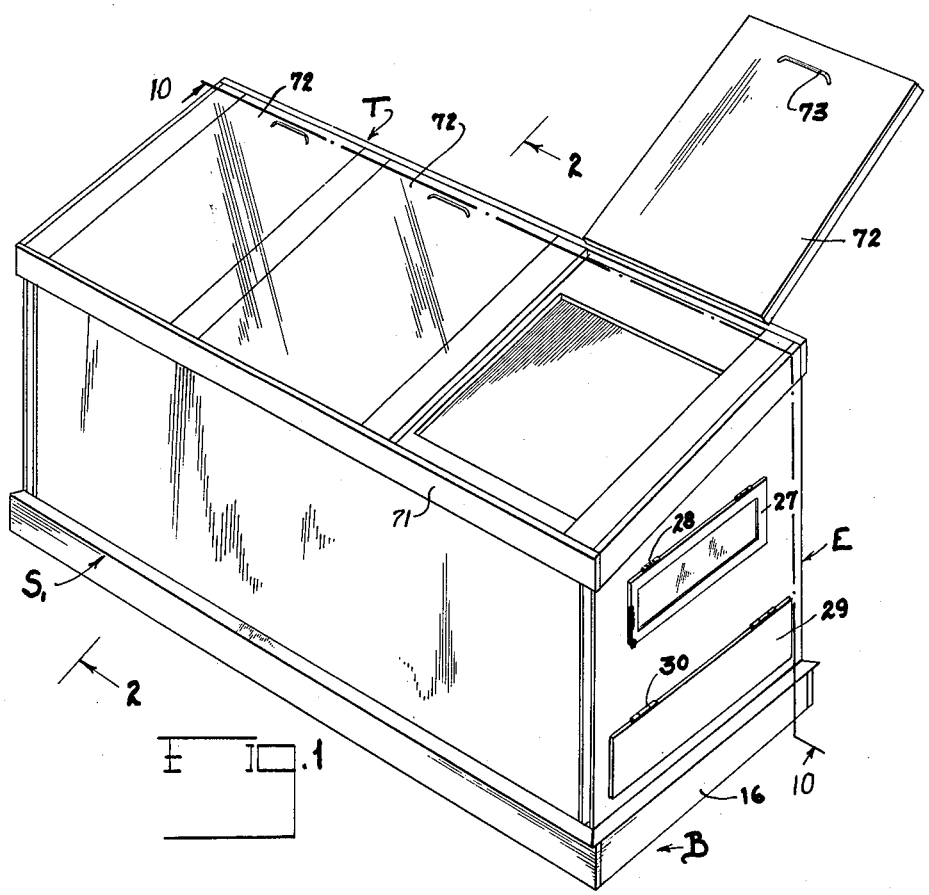
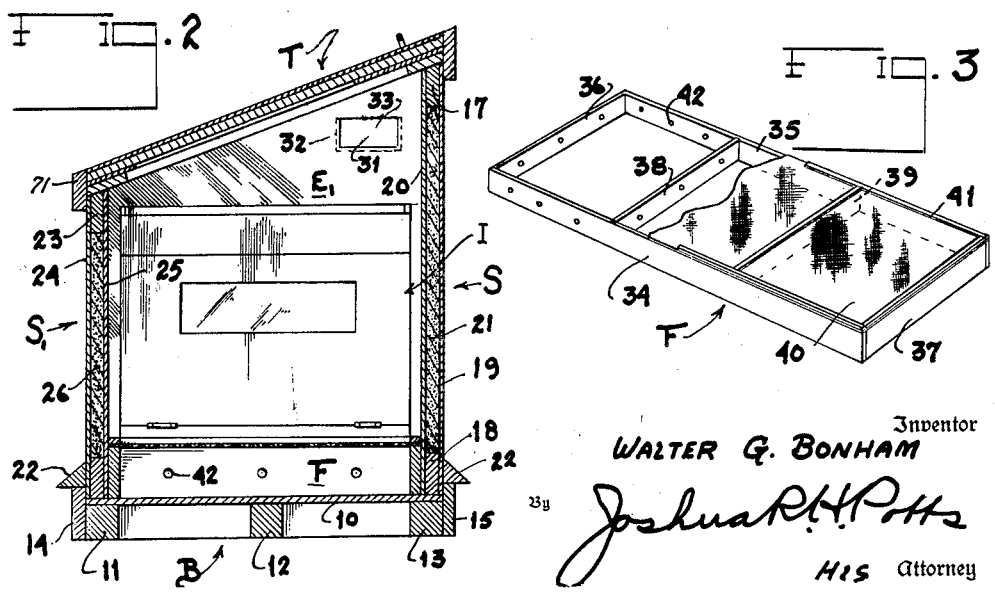
Inventor
WALTER G. BONHAM
By Joshua R. H. Potts
His Attorney

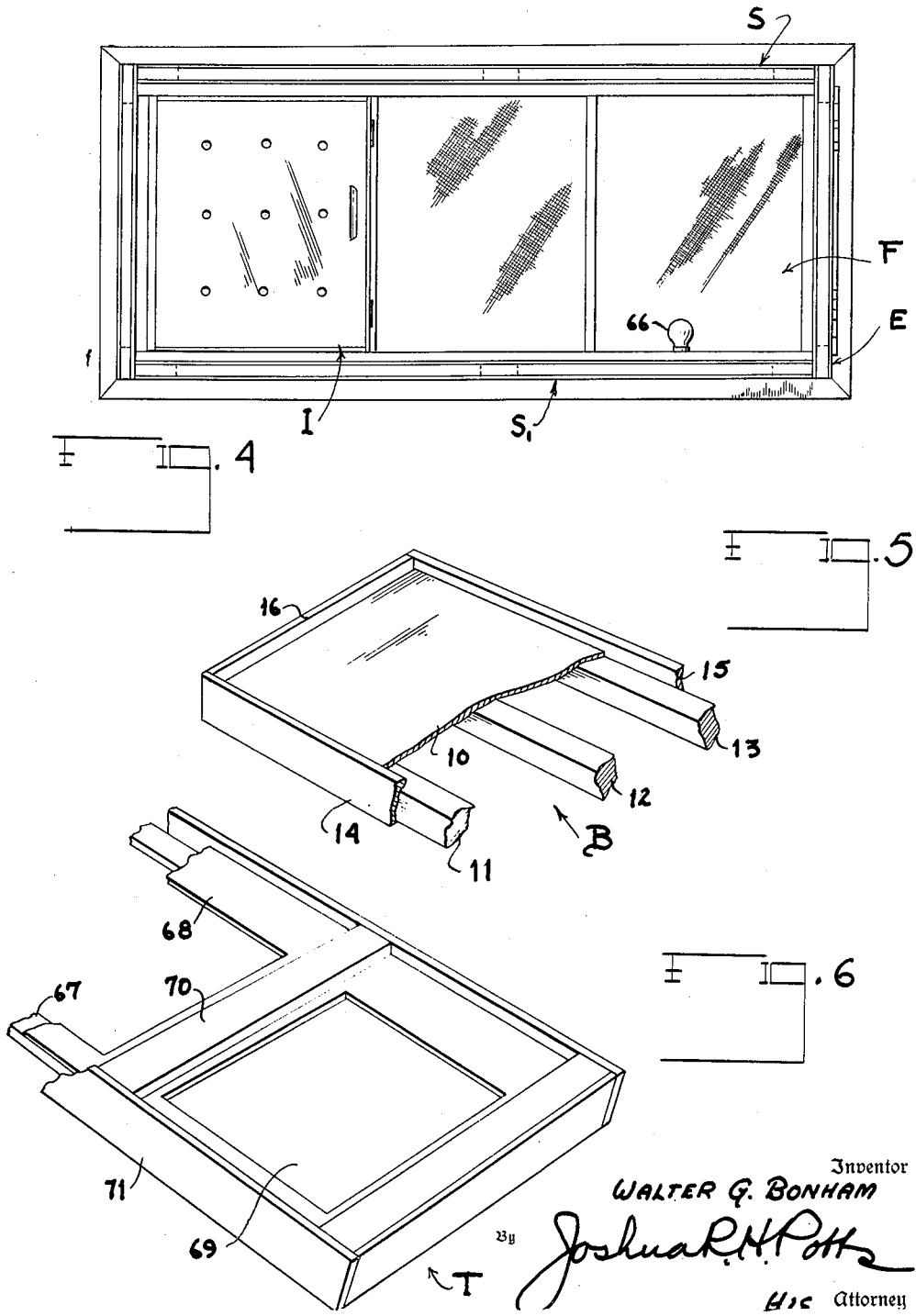

Sept. 20, 1955 W. G. BONHAM 2,718,210
COMBINATION INCUBATOR AND BROODER
Filed March 30, 1949 4 Sheets-Sheet 3

Inventor
WALTER G. BONHAM
By Joshua R. H. Potts
His Attorney

Sept. 20, 1955  W. G. BONHAM  2,718,210
COMBINATION INCUBATOR AND BROODER
Filed March 30, 1949  4 Sheets-Sheet 4
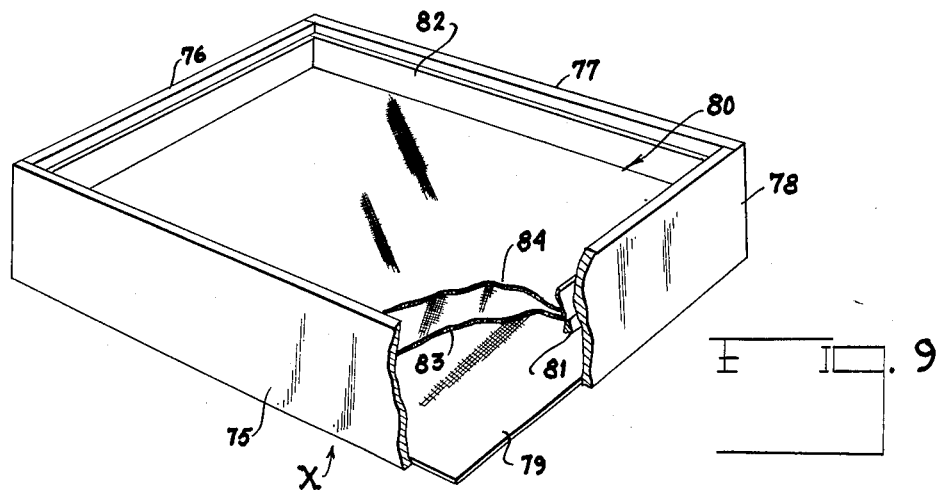
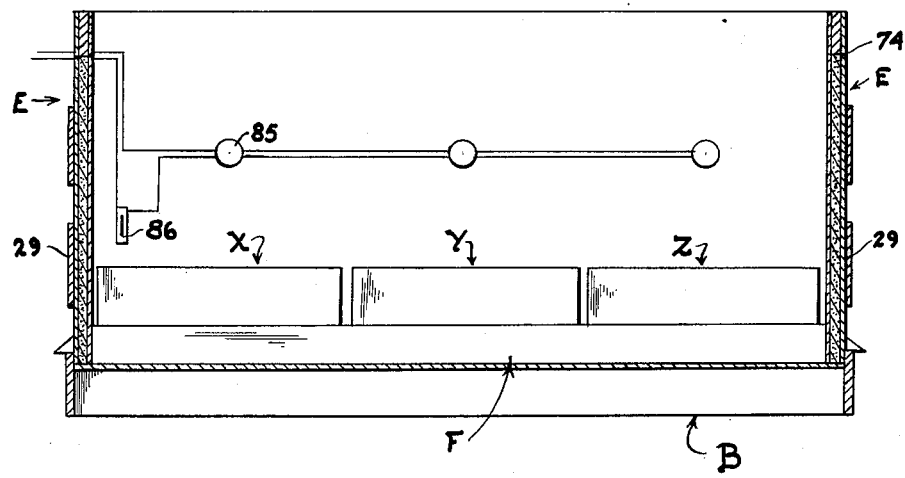
Inventor
WALTER G. BONHAM
By Joshua R. H. Potts
His Attorney

United States Patent Office 2,718,210
Patented Sept. 20, 1955

2,718,210

COMBINATION INCUBATOR AND BROODER

Walter G. Bonham, Oakland, Calif., assignor of one-half to Frank Vlchek, Jr., Chicago, Ill.

Application March 30, 1949, Serial No. 84,291

4 Claims. (Cl. 119—30)

The present invention relates to a combination incubator and brooder of the same general type illustrated and described in the United States patent of Walter G. Bonham, No. 2,496,433, issued February 7, 1950, and is concerned primarily with certain novel features of construction which render the assembly more compact and the entire structure readily assemblable and disassemblable.

It is now well recognized by those versed in the art of hatching chicken eggs that an incubator which receives the eggs during the incubation period should have a certain temperature and predetermined conditions of air circulation and humidity. A brooder which receives the chicks after hatching should have a somewhat lower temperature, and, while there should be adequate air circulation therein, it is not so important that the humidity be controlled.

With the foregoing conditions in mind, the present invention has in view as an important object the provision of a combination incubator and brooder of the general type with which this invention is concerned which includes means for heating the incubator to a required temperature, supplying humidity to the air thereof, and causing the circulation of air therethrough, and means for heating the brooder to a required temperature and circulating the air therethrough.

Commercial hatcheries ordinarily use large size incubators and brooders which are permanent installations and build as such. However, there are many small operators such as farmers, truck gardeners, and other suburban dwellers to whom the hatching and raising of chickens is auxiliary and subordinate to their main activities. Such operators usually incubate a fairly small number of eggs at any one time, the number ranging from three hundred to one thousand; and from the very nature of the operation the incubator and brooder should be combined as a single unit and be susceptible of movement from place to place about the premises of the owner. Moreover, it is desirable that a combination incubator and brooder of this type be susceptible of production under low manufacturing costs and of being shipped in a knocked-down condition. Such a combination incubator and brooder readily lends itself to production under low cost with resultant savings to the ultimate buyer.

With these conditions in mind, the invention has as another highly important object the provision, of a combination incubator and brooder of the type indicated, which comprises several main elements which may be individually produced as such and which may be shipped in their disassembled relation. These elements are adapted to be easily assembled into the final construction at the particular site where the combination incubator and brooder is to be used.

More in detail, the invention has as an object the provision, of a combination incubator and brooder, which conists essentially of eight main parts which may be readily assembled into the ultimate construction. These parts are a bottom, front and rear walls, two side walls, a wire floor, an incubator box, and a top. Various detailed objects and advantages of the invention are associated with the provision of these elements with certain necessary features.

Another highly important object of the present invention is the provision, of a combination incubator and brooder of the type aforesaid, which is "all electric" in character, that is, the heat of the incubator and brooder is carried out by electrical heating devices that are thermostatically controlled.

Another object of the invention is to provide a modified form of a unit of this type which is adapted to function either as an incubator or brooder. When used as an incubator substantially the entire interior space is occupied by egg containing trays which are removed after hatching to leave the structure in condition for use as a brooder.

Various other more detailed objects and advantages of the invention such as arise in connection with carrying out the above noted ideas in a practical embodiment will, in part become apparent, and in part be hereinafter stated as the description of the invention proceeds.

The invention therefore comprises a knocked-down all electric combination incubator and brooder which consists of eight main elements, namely, a bottom, front and rear walls, two end walls, a wire floor, an incubator box, and a top which may be individually produced and shipped in their disassembled relation. These elements may be assembled by the ultimate purchaser to provide a combination incubator and brooder in which the incubator box is individually heated, the humidity of the air therein controlled, and the air caused to circulate therethrough; and the brooder is individually heated with air circulation provided therefor. A modified form of the invention provides a unit that may be first completely used as an incubator and then as a brooder.

For a full and more complete understanding of the invention, reference may be had to the following description and accompanying drawings wherein:

Figure 1 is a perspective view of a combination incubator and brooder that is designed in accordance with the precepts of this invention and shown with one of the top doors removed.

Figure 2 is a transverse vertical section through the assembled structure, being taken about on the plane represented by the line 2—2 of Figure 1.

Figure 3 is a detailed perspective, taken on a smaller scale, of a wire mesh floor per se with a portion of the mesh broken away.

Figure 4 is a top plan view of the assembled structure with the top removed.

Figure 5 is a detailed perspective taken on an enlarged scale of one end of the bottom with parts broken away and shown in section to more clearly bring out details of the construction thereof.

Figure 6 is a similar view of one end of the top.

Figure 9 is a perspective view of an egg tray used in a modified form of the invention; and Figure 10 is a longitudinal vertical section taken along line 10—10 through the walls of the visible hull structure of Fig. 1, the structure of Figs. 2 and 7 having been removed, and in modification the egg trays in place of such structure are shown in elevation.

Referring now to the drawings wherein like reference characters denote corresponding parts, the several main assemblies which make up the combination incubator and brooder of this invention will be identified in their relation to one another.

Figure 7:
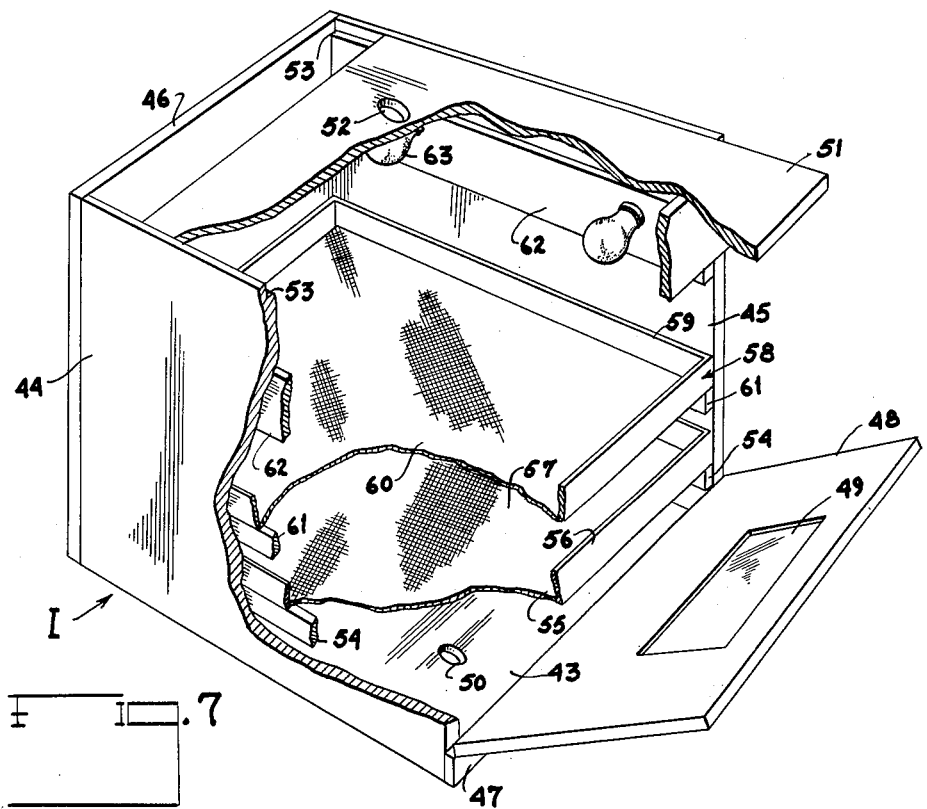
Figure 7 is a detailed perspective of the incubator box taken on an enlarged scale and with parts broken away and showing one wall which is formed with a window as partially removed.

The bottom is identified in its entirety by the reference character B. This bottom is shown in the perspective view of Figure 1, in section in Figure 2, and the details of construction brought out in Figure 5.

A back wall is referred to in its entirety by the reference character S and is shown in section in Figure 2. A front wall is designated $S_1$, and this wall is shown in the perspective view of Figure 1 and in section in Figure 2.

It is recognized that the terms "right" and "left" may be somewhat ambiguous. However, as used in identifying the end walls, the terms are employed with the front wall $S_1$ considered as the base from which they are located. The right end wall is designated E and is shown in Figure 1. The left end wall is designated $E_1$ and appears in elevation in Figure 2.

The wire mesh floor is referred to in its entirety by the reference character F and is shown in section in Figure 2, perspective in Figure 3, and in top plan in Figure 4.

The incubator box is referred to in its entirety by the reference character I. This box is shown in perspective in Figure 7 and in top plan in Figure 4. The top is designated T and is shown in perspective in Figure 1, in section in Figure 2, and in detail in Figure 6.

Referring now more particularly to Figures 2 and 5, the bottom B is shown as comprising a piece of plywood 10 which has a size and shape corresponding to the outer dimensions of the structure as determined by the side and end walls. Nailed to the underface of this plywood member 10 are three runners 11, 12, and 13 which are arranged with the runners 11 and 13 extending along the side edges of the member 10 and the runner 12 substantially at the middle thereof. These runners are preferably square in cross section.

Secured to the outer face of the runner 11 and extending upwardly above the plywood member 10 an appropriate distance is a side strip 14, and a similar side strip 15 is secured to the outer face of strip 13 in a similar manner as by nails. A pair of end strips 16 are nailed to the opposite ends of the runners 11, 12, and 13 and extend up above the plywood member 10. The side strips 14 and 15 together with the end strips 16 define an upstanding flange or lip completely around the floor member 10.

Referring now more particularly to Figure 2, the back side S is illustrated as comprising a rectangular framework made up of a top piece 17 and a bottom piece 18 and end pieces (not illustrated). A sheet of aluminum 19 is secured to the outer face of top piece 17, bottom piece 18, and the end pieces; while a sheet of plywood 20 is secured to the inner face of these members. The space between the aluminum sheet 19 and plywood 20 may be filled with an appropriate heat insulating material such as represented at 21. This insulation is preferably rock wool.

When the back side wall S is in its erected vertical position, the lower edge thereof rests on the plywood member 10 of the bottom B with the outer aluminum surface engaging the upwardly extending lip of the side strip 15. A piece of weather stripping such as shown at 22 is secured in the corner defined by the outer face of the aluminum sheet 19 and top edge of the side strip 15. This weather strip 22 preferably has the triangular cross section illustrated in Figure 2.

Still referring to Figure 2, the front side wall $S_1$ is shown as having a construction similar to that of the back side wall S above described with the exception that is not as high. Thus the front wall $S_1$ comprises a rectangular framework identified as 23, an outer aluminum sheet 24, an inner sheet of plywood 25, with insulation 26 filling the space between sheets 24 and 25. In its assembled position, this front side wall $S_1$ rests on the member 10 and engages the inner face of the member 14 thereabove. Another piece of weather stripping 22 is secured in the corner defined by the outer surface of the aluminum sheet 24 and the top edge of the side strip 14.

Referring now more particularly to Figure 1, the right end wall E will be described. This wall E has a construction corresponding to that of the walls S and $S_1$, that is, it consists of a framework having a shape corresponding to the end of the brooder with a sheet of aluminum nailed to the outer face of the framework and a sheet of plywood to the inner face. Insulation fills the space between these sheets. The end wall E is provided with a window 27 which is hingedly secured as indicated at 28 to the outer face of the end wall. This window 27 is preferably located in the upper portion of the end wall E. Below this window 27 there is an elongated opening which is normally closed by a door 29, the latter being hingedly mounted as represented at 30. The door 29 is opened either for air circulation purposes or to permit chicks in the brooding stage to come in or out of the brooder.

The left end wall $E_1$ has a construction identical to that above described in connection with the walls S, $S_1$, and E. That is, it is defined by a framework, an outer sheet of aluminum, an inner sheet of plywood, with insulation between the two. This left end wall $E_1$ is formed with a ventilating opening at 31 which normally may be closed by door 32 that is hingedly mounted as represented at 33.

Referring now more particularly to Figures 2 and 3, the wire mesh floor assembly F will be described. This floor F comprises a rectangular framework having a size and shape corresponding to the inside dimensions of the side and end walls when the latter are assembled. This rectangular framework comprises side frame members 34 and 35, end frame members 36 and 37, and cross members 38 and 39. Laid over the upper edges of these frame members 34, 35, 36, 37, 38, and 39 is a piece of wire mesh 40 which may be held in position by the retaining strips 41 that are nailed over the respective top edges of the frame members.

The incubator box I is intended to rest on that part of the wire floor F defined by an end frame member 36 and cross member 38 with the corresponding portions of the side frame members 34 and 35. In order to insure adequate circulation of the air through the incubator box, the frame members 36 and 38 and the portion of the members 34 and 35 therebetween are formed with air circulation openings 42. As is brought out in Figure 2, the floor F is positioned with the lower edges of the several frame members resting on the member 10 of the bottom B.

Referring now more particularly to Figure 7, the incubator box I is shown as comprising a bottom 43 from which upstands a front wall 44, a rear wall 45, an outer end wall 46, with an inner strip 47 supporting an inner end wall 48 which is removably positioned in the incubator box assembly. This inner wall 48 is formed with an inner opening designated 49 and which ordinarily will be closed by a window pane.

The bottom 43 is formed with air circulation openings 50, while a top 51 is formed with similar air circulation openings as indicated at 52. The top 51 is slidably positioned on flanges 53 that are formed by notching or cutting away the upper edges of the front and rear walls 44 and 45.

Secured to the inner faces of the walls 44 and 45 are a pair of strips 54 which provide means for supporting a sand tray 55 that is adapted to be slid into and out of position in the incubator box I. This sand tray 55 comprises a rectangular framework 56 which carries a wire mesh screen 57.

A tray intended to receive the eggs to be hatched is shown at 58 and comprises an outer framework 59 which carries a wire mesh bottom 60. This tray 58 is slidably positioned on strips 61 which are nailed to the inner faces of the walls 44 and 45.

Also secured to the inner faces of these walls 44 and 45 are a pair of strips 62 which carry an appropriate number of heating lamps 63 which preferably are darkened. These heating lamps are included in a circuit which also includes a thermostat in a well known manner and which is illustrated in the modification to be later described.

Figure 8:
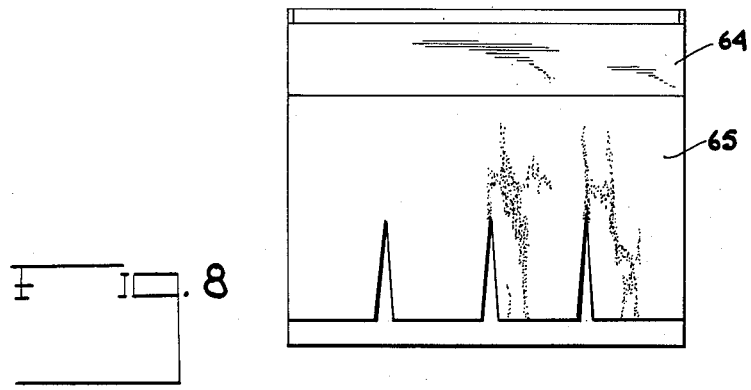
Figure 8 is an elevational view of a curtain which may be substituted for the removable wall of the incubator box.

As above explained, the inner wall is removable. When the eggs begin to hatch, this wall may be replaced by a substitute inner wall 64 which is illustrated in Figure 8 and which includes a brooder curtain 65. This curtain permits hatched chicks to pass from the incubator box I into the brooder compartment, at the same time maintaining the temperature of the incubator box at the required point which is higher than that of the brooder compartment.

At this point, it is well to note that the brooder compartment is also provided with one or more heating lamps such as shown at 66 in Figure 4 and which will be included in the circuit controlled by a thermostat.

Referring now more particularly to Figures 1 and 7, the top T comprises an under framework made up of stringers 67. Nailed to the upper face of this framework is a piece of plywood 68 which is cut out to provide three door openings 69. Nailed across the upper face of this plywood over the portions left between the openings 69, and at the edges are cross stringers 70. An edge framework designated 71 is made up of flat strips which are nailed to the edges of the framework 67 and the ends and edges of the crosspiece 70. It is evident that the front and rear members of the framework 71 together with the crosspiece 70 define spaces for snugly receiving doors 72. The latter are removable and handles shown at 73 are provided for facilitating the manipulation thereof.

When the top T is assembled on the unit, the inner framework 67 rests on the top edges of the walls S, $S_1$, E, and $E_1$, while the edge of the framework 71 overlaps the outer faces of these walls, the top fitting much in the manner of a shoe box and is completely removable.

Operation, Figures 1 to 8

It is evident that with the top T completely removable as well as each of the doors 72, access may be had to the interior of the structure. At the start of a hatch, sand is placed on the tray 55 and is saturated with a required amount of water. Eggs are placed on the tray 58 and the door 48 positioned to close the incubator box I. The electric current is turned on and the air in both the brooding compartment and the incubator is heated. This preliminary heating of the air in the brooder is important, because, as air passes from the latter, up through the openings in the incubator box, it is preheated as there is only a small difference in temperature between the brooder and the incubator. This preheated air circulates through the water-saturated sand of the sand tray and acquires a desired humidity. It passes out through the openings 52 and ventilator openings 31.

When an occasion arises to turn the eggs, the top 51 may be slid over and the door 72 immediately above the incubator box removed, thereby providing easy access to the eggs. After the elapse of eighteen days, the wall 48 may be replaced by the wall 64 having the brooder curtain 65. Thus, as the chicks are hatched, they can pass through this curtain into the brooding compartment. The door 29 may be opened to permit well-developed chicks to pass out of the compartment to the exterior of the brooder. Either this door or the door 27 may be also opened to a desired degree to admit a required amount of fresh air into the brooder.

Modification

The invention also contemplates a construction substantially the same as that above described which is adapted to be completely used either as an incubator or a brooder. Upon referring to Figure 10, it will be noted that the unit of the modification comprises a bottom B which is of the same construction as that described in connection with Figures 1 and 2. The rear side wall S and front side wall $S_1$ are also the same as that described in connection with Figures 1 and 2. The right end wall E is the same as the right end wall E of Figure 2 with the exception that a small ventilating opening diagrammatically represented at 74 has been formed therein. The left-hand end wall is the exact duplicate of the right-hand end wall and is also identified by the reference character E. The top T is also the same as that described in connection with Figures 1 and 2. The usual wire floor F rests on the bottom B in the manner above described.

The essential difference between the form of invention shown in Figures 9 and 10 and that illustrated in Figures 1 to 8 is that the incubator box I is completely eliminated and replaced by three egg receiving trays designated X, Y, and Z. These three trays rest on the wire floor F and are of substantially identical construction. One of these trays is illustrated in detail in Figure 9. It comprises a square framework made up of walls 75, 76, 77, and 78 which are of a height admitting their insertion through either opening closed by the door 29 in the end walls E. Secured to this framework is a bottom 79 of plywood. An egg receiving tray referred to in its entirely by the reference character 80 rests on strips 81 which are nailed to the inner faces of the members 75, 76, 77, and 78. This tray 80 comprises a marginal framework 82, a heavy wire screen 83, and a top light screening 84.

Either or both of the walls S and $S_1$ is provided with a series of heating lamps such as represented at 85. These are concluded in an electrical circuit which also includes a thermostat represented at 86 which is located just above the position assumed by the trays X, Y, and Z. The wires of this system may be passed out either of the openings 74 as shown in Figure 10.

In using the modification as shown in Figures 9 and 10, the floor 79 of each tray is covered with sand that is saturated with water. The eggs are placed on the wire mesh frame member 80. The trays X, Y, and Z are inserted into the unit through the openings closed by the door 29. They rest on the bottom F. After the chicks are hatched, these trays may be removed whereby the structure is adapted for use as a brooder, the only change necessary being to adjust the thermostatic control 86 so that the interior temperature would be that required of a brooder.

While preferred specific embodiments of the invention are hereinbefore set forth, it is to be clearly understood that the invention is not to be limited to the exact constructions illustrated and described because various modifications of these details may be provided in putting the invention into practice within the purview of the appended claims.

What is claimed is:

1. A knock-down incubator-brooder comprising a rectangularly shaped bottom having an upstanding flange extending around the periphery thereof, side and end walls resting on said bottom with their exterior faces engaging said flange, a top of rectangular formation having a depending flange extending over said walls, a wire floor resting on said bottom, an incubator box removably positioned on said wire floor and provided with air circulation openings, a sand tray in said incubator box, an egg receiving tray in said incubator box, and electric heating lamps in said incubator box.

2. A knock-down incubator-brooder comprising a rectangularly shaped bottom having an upstanding flange extending around the periphery thereof, side and end walls resting on said bottom with their exterior faces engaging said flange, weather stripping in the corners defined by the top edges of said flange and the exterior faces of said walls, a top of rectangular formation having a depending flange extending over said walls, a wire floor resting on said bottom, and an incubator box removably positioned on said floor, said incubator box including an inner removable wall, a slidable top, and slidable sand and egg receiving trays, said incubator box and one of said end walls being formed with air circulation openings.

3. In a knock-down incubator-brooder, a removable incubator box comprising a bottom, front and rear walls upstanding from said bottom, an outer end wall upstanding from said walls and secured to said front and rear walls, a removable inner wall, a sand receiving tray removably positioned in said box in spaced relation to said bottom, an egg receiving tray removably positioned in said box in a position spaced above said sand receiving tray, and a removable top, said top and bottom being formed with air circulation openings.

4. In a knock-down incubator-brooder, a removable incubator box comprising a bottom, front and rear walls upstanding from said bottom, an outer end wall upstanding from said walls and secured to said front and rear walls, a removable inner wall, a sand receiving tray removably positioned in said box in spaced relation to said bottom, an egg receiving tray removably positioned in said box in a position spaced above said sand receiving tray, a top slidably positioned between said front and rear walls, and electric heating lamps carried by said front and rear walls, said top and bottom being formed with air circulation openings.

References Cited in the file of this patent

UNITED STATES PATENTS

| Number | Name | Date |
|---|---|---|
| 195,593 | Evans | Sept. 25, 1877 |
| 1,051,988 | Clayton | Feb. 4, 1913 |
| 1,245,829 | Vance | Nov. 6, 1917 |
| 1,270,700 | Conklin | June 25, 1918 |
| 1,289,510 | Miller | Dec. 31, 1918 |
| 1,300,957 | Harrison | Apr. 15, 1919 |
| 1,460,349 | Oakes | June 12, 1921 |
| 1,384,084 | Myers | July 12, 1921 |
| 1,533,574 | Spratling | Apr. 14, 1925 |
| 1,683,966 | Forster | Sept. 11, 1928 |
| 1,777,082 | Hale | Sept. 30, 1930 |
| 1,833,020 | Hillpot | Nov. 24, 1931 |
| 1,979,877 | Hane | Nov. 6, 1934 |
| 1,986,501 | Conway et al. | Jan. 1, 1935 |
| 2,192,933 | Saborsky | Mar. 12, 1940 |

FOREIGN PATENTS

| | | |
|---|---|---|
| 1,155 | Great Britain | Mar. 24, 1877 |